United States Patent
Cha et al.

(10) Patent No.: US 10,840,017 B2
(45) Date of Patent: *Nov. 17, 2020

(54) MULTILAYER CERAMIC ELECTRONIC COMPONENT HAVING IMPROVED INTERNAL ELECTRODE, AND METHOD OF MANUFACTURING THE SAME

(71) Applicant: SAMSUNG ELECTRO-MECHANICS CO., LTD., Suwon-si (KR)

(72) Inventors: Kyoung Jin Cha, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 85 days.

This patent is subject to a terminal disclaimer.

(21) Appl. No.: 16/168,498

(22) Filed: Oct. 23, 2018

(65) Prior Publication Data

US 2020/0066454 A1 Feb. 27, 2020

(30) Foreign Application Priority Data

Aug. 23, 2018 (KR) .................. 10-2018-0098608

(51) Int. Cl.
  *H01G 4/008* (2006.01)
  *H01G 4/30* (2006.01)
  *H01G 4/12* (2006.01)

(52) U.S. Cl.
  CPC ............. *H01G 4/0085* (2013.01); *H01G 4/30* (2013.01); *H01G 4/1227* (2013.01)

(58) Field of Classification Search
  CPC ........ H01G 4/0085; H01G 4/008; H01G 4/30; H01G 4/1227
  See application file for complete search history.

(56) References Cited

U.S. PATENT DOCUMENTS

2002/0146564 A1* 10/2002 Takai .................. B22F 1/02
  428/403
2004/0256603 A1* 12/2004 Celik .................. C22C 1/04
  252/500

(Continued)

FOREIGN PATENT DOCUMENTS

JP       05290622 A   * 11/1993
JP     2004-221304 A    8/2004

(Continued)

OTHER PUBLICATIONS

Notice of Office Action issued in Korean Patent Application No. 10-2018-0098608, dated Oct. 21, 2019 (with English Translation).

*Primary Examiner* — David M Sinclair
(74) *Attorney, Agent, or Firm* — Morgan, Lewis & Bockius LLP (57) ABSTRACT

A method of manufacturing a multilayer ceramic electronic component includes preparing a ceramic green sheet, forming an internal electrode pattern by coating a paste for an internal electrode including conductive powder including tin (Sn) on the ceramic green sheet, forming a ceramic multilayer structure by stacking ceramic green sheets on which the internal electrode pattern is formed, and forming a body including a dielectric layer and an internal electrode by sintering the ceramic multilayer structure. A content of tin (Sn) based on the conductive powder is greater than or equal to about 1.5 wt %. A coating layer including tin (Sn) is formed on a surface of the conductive powder, or the conductive powder includes an alloy of tin (Sn).

21 Claims, 4 Drawing Sheets

(56) References Cited

U.S. PATENT DOCUMENTS

| | | | |
|---|---|---|---|
| 2006/0221547 A1 | 10/2006 | Miura et al. | |
| 2007/0125195 A1* | 6/2007 | Akimoto | B22F 1/0074 |
| | | | 75/252 |
| 2011/0141652 A1* | 6/2011 | Chang | H01G 4/012 |
| | | | 361/272 |
| 2013/0063862 A1* | 3/2013 | Kim | H01G 4/005 |
| | | | 361/305 |
| 2015/0170838 A1* | 6/2015 | Suzuki | H01G 4/30 |
| | | | 361/301.4 |
| 2015/0200055 A1* | 7/2015 | Ishida | H01G 4/012 |
| | | | 361/301.4 |
| 2016/0230026 A1 | 8/2016 | Furusawa | |
| 2016/0254094 A1* | 9/2016 | Lee | H01G 4/30 |
| | | | 361/301.4 |
| 2018/0204678 A1* | 7/2018 | Yamaguchi | H01G 4/1227 |
| 2020/0058444 A1* | 2/2020 | Cha | H01G 4/008 |

FOREIGN PATENT DOCUMENTS

| | | |
|---|---|---|
| JP | 2005-281712 A | 10/2005 |
| JP | 2006-310760 A | 11/2006 |
| JP | 2011-151089 A | 8/2011 |
| JP | 2013-170303 A | 9/2013 |
| JP | 2018-104819 A | 7/2018 |
| KR | 10-0950127 B1 | 3/2010 |
| KR | 10-2016-0035094 A | 3/2016 |
| WO | 2003/033752 A1 | 4/2003 |

\* cited by examiner

MULTILAYER CERAMIC ELECTRONIC COMPONENT HAVING IMPROVED INTERNAL ELECTRODE, AND METHOD OF MANUFACTURING THE SAME

CROSS-REFERENCE TO RELATED APPLICATION(S)

This application claims the benefit of priority to Korean Patent Application No. 10-2018-0098608 filed on Aug. 23, 2018 in the Korean Intellectual Property Office, the disclosure of which is incorporated herein by reference in its entirety.

BACKGROUND

1. Field

The present disclosure relates to a multilayer ceramic electronic component and a method of manufacturing the same.

2. Description of Related Art

In general, an electronic component using a ceramic material, for example, a capacitor, an inductor, a piezoelectric element, a varistor, or a thermistor, includes a body formed of a ceramic material, an internal electrode formed in the body, and an external electrode installed on a surface of the body to be connected to the internal electrode.

A multilayer ceramic capacitor of a multilayer ceramic electronic component includes a plurality of stacked dielectric layers, internal electrodes disposed to face each other across the dielectric layer, and an external electrode electrically connected to the internal electrode.

A multilayer ceramic capacitor may be miniaturized, have a high capacity and may be advantageously and easily installed and, thus, has been widely used as a component in mobile communication devices, such as a computer, a personal digital assistant (PDA), and a cellular phone.

Recently, along with high capacity, and lightness, thinness, compactness, and smallness in electrical and electronic device industries, there has been a need for miniaturized, high-capacity, and super high-capacity electronic components.

In particular, there is a need for a technology for maximizing capacitance per unit volume along with high capacity and miniaturization of a multilayer ceramic capacitor.

Accordingly, in the case of an internal electrode, high capacity needs to be provided by minimizing a volume and increasing a number of stacked sheets while achieving a maximum area.

However, as an internal electrode is thinned, a ratio of a thickness to an area is lowered to increase sintering driving force and, thus, an increase in electrode disconnection and lumping may be serious.

Accordingly, to embody a high-capacity multilayer ceramic capacitor, there is a need for a method of manufacturing a miniaturized and high-capacity multilayer ceramic capacitor with high reliability which avoids electrode disconnection and electrode lumping, which may occur when a thinned internal electrode is formed.

SUMMARY

An aspect of the present disclosure may provide a method of manufacturing a miniaturized and high-capacity multilayer ceramic capacitor with high reliability where electrode disconnection and electrode lumping are avoided.

According to an aspect of the present disclosure, a method of manufacturing a multilayer ceramic electronic component includes preparing a ceramic green sheet, forming an internal electrode pattern by coating a paste for an internal electrode including conductive powder including tin (Sn) on the ceramic green sheet, forming a ceramic multilayer structure by stacking ceramic green sheets on which the internal electrode pattern is formed, and forming a body including a dielectric layer and an internal electrode by sintering the ceramic multilayer structure. A content of tin (Sn) greater than or equal to about 1.5 wt %, based on a total weight of the conductive powder, and a coating layer is formed on a surface of the conductive powder, the coating layer including tin (Sn), or the conductive powder includes an alloy of tin (Sn).

According to another aspect of the present disclosure, a multilayer ceramic electronic component manufactured using the method as described above may include a body including a dielectric layer and an internal electrode, and an external electrode disposed on the body, wherein the internal electrode includes a nickel (Ni) crystal grain and a composite layer surrounding the nickel (Ni) crystal grain and including nickel (Ni) and tin (Sn).

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

In the drawings, an X direction may be defined as a first direction, an L direction, or a longitudinal direction, a Y direction may be defined as a second direction, a W direction, or a width direction, and a Z direction may be defined as a third direction, a T direction, or a thickness direction.

Figure 1:
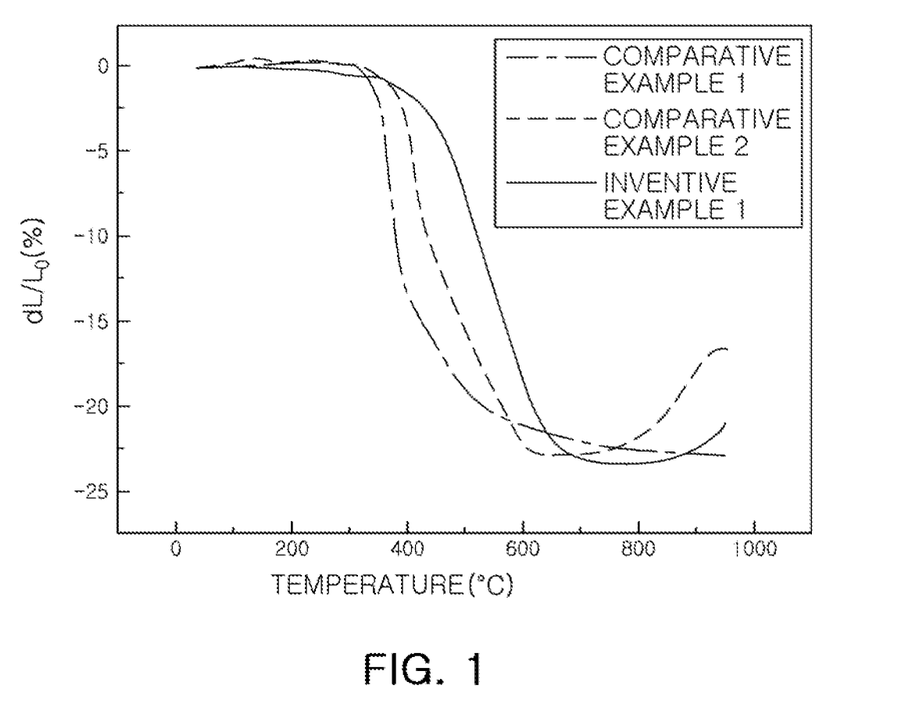
FIG. 1 is a graph illustrating comparison of a thermal contraction behavior depending on a change in content of tin (Sn) included in a coating layer based on conductive powder.

FIG. 1 is a graph illustrating comparison of a thermal contraction behavior depending on a change in content of tin (Sn) included in a coating layer based on conductive powder.

Figure 2A:
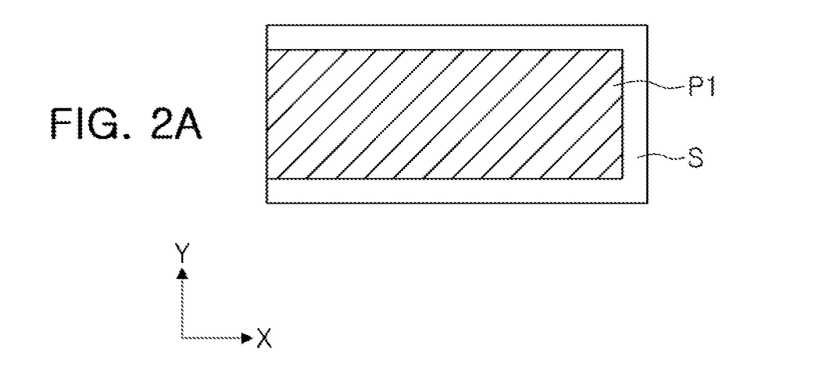
FIGS. 2A and 2B are schematic diagrams illustrating ceramic green sheets with an internal electrode pattern formed thereon.
Figure 2B:
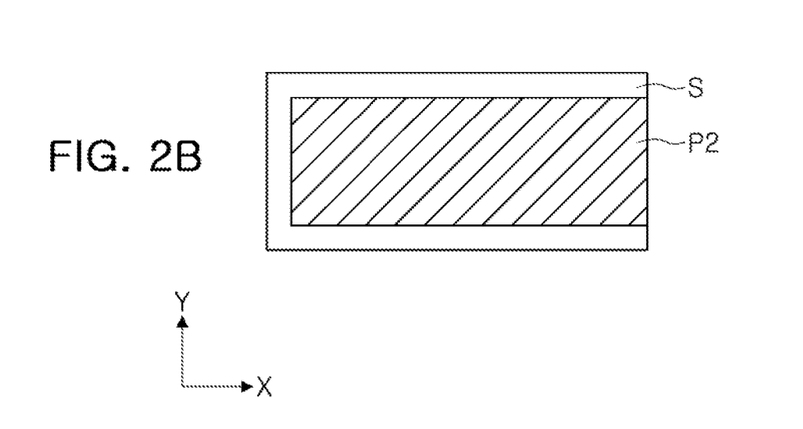

FIGS. 2A and 2B are schematic diagrams illustrating ceramic green sheets with an internal electrode pattern formed thereon.

Figure 3:
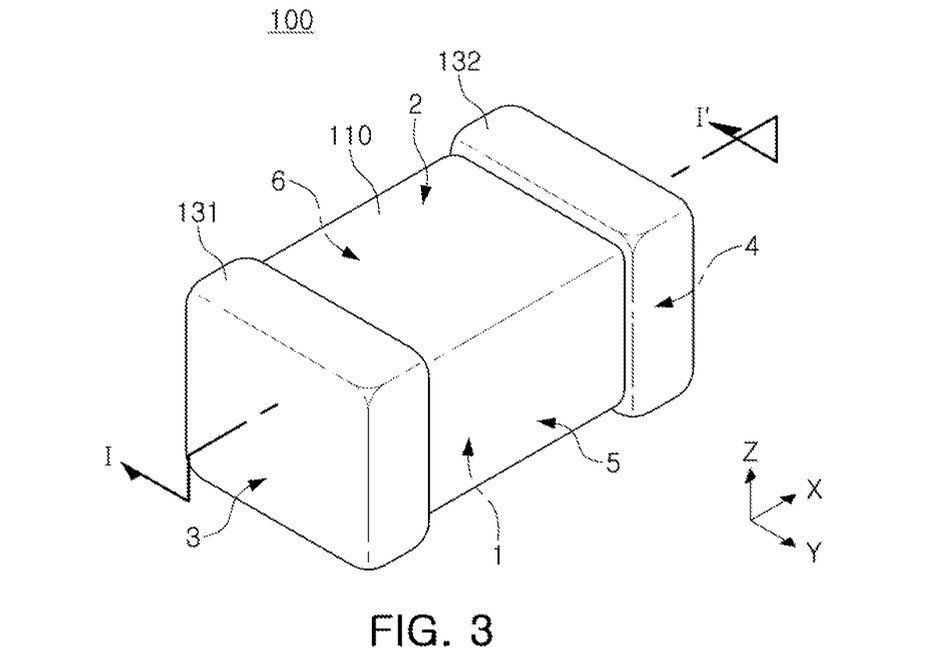
FIG. 3 is a schematic perspective view of a multilayer ceramic electronic component manufactured using a method of manufacturing a multilayer ceramic electronic component according to an exemplary embodiment of the present disclosure.

FIG. 3 is a schematic perspective view of a multilayer ceramic electronic component manufactured using a method of manufacturing a multilayer ceramic electronic component according to an exemplary embodiment of the present disclosure.

Figure 4:
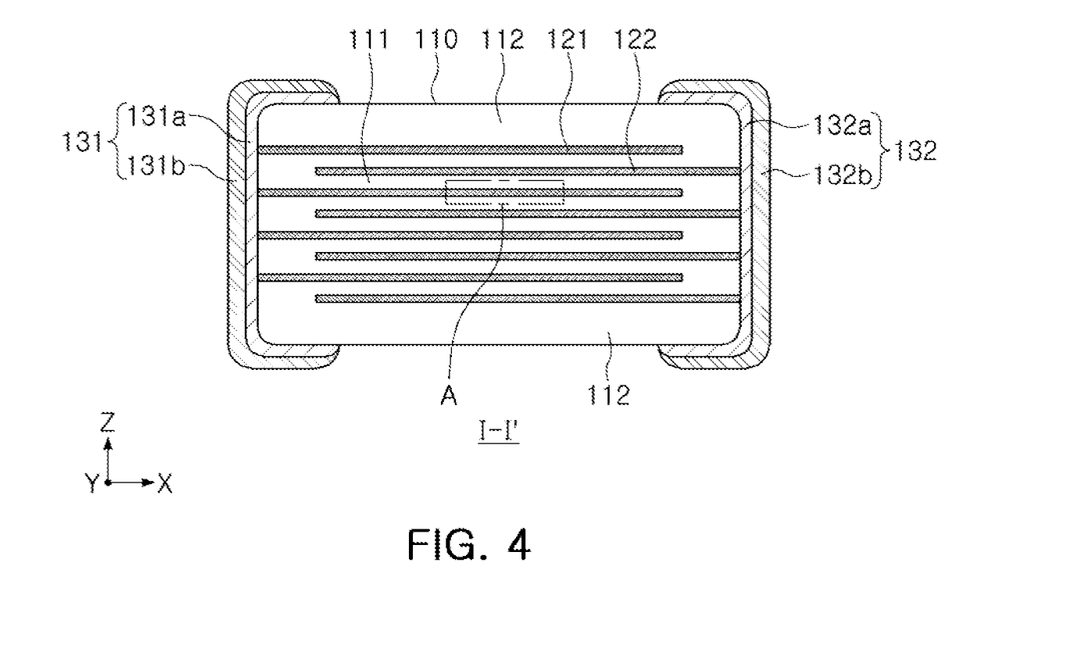
FIG. 4 is a cross-sectional view taken along a line I-I' of FIG. 3.

FIG. 4 is a cross-sectional view taken along a line I-I' of FIG. 3.

Figure 5:
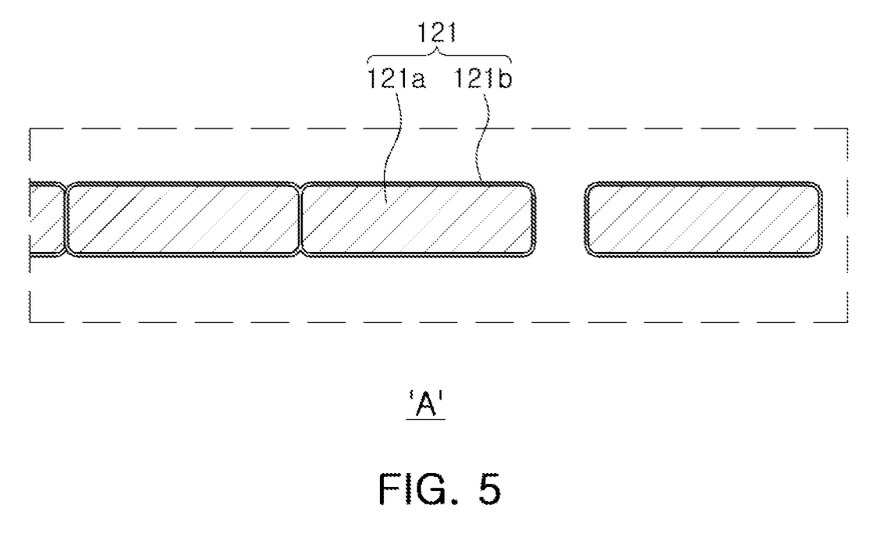
FIG. 5 is an enlarged view of portion 'A' of FIG. 4.

FIG. 5 is an enlarged view of portion 'A' of FIG. 4.

Hereinafter, a method of manufacturing a multilayer ceramic electronic component and a multilayer ceramic electronic component manufactured using the method according to an exemplary embodiment of the present disclosure are described in detail with reference to FIGS. 1 to 5.

Method of Manufacturing Multilayer Ceramic Electronic Component

A method of manufacturing a multilayer ceramic electronic component according to an exemplary embodiment of the present disclosure may include preparing a ceramic green sheet, forming an internal electrode pattern by coating a paste for an internal electrode including conductive powder including a coating layer formed on a surface thereof and including tin (Sn) or conductive powder including tin (Sn) in the form of an alloy, on the ceramic green sheet, forming a ceramic multilayer structure by stacking ceramic green sheets on which the internal electrode pattern is formed, and forming a body including a dielectric layer and an internal electrode by sintering the ceramic multilayer structure, wherein a content of tin (Sn) is greater than or equal to about 1.5 wt %, based on a total weight of the conductive powder.

Preparing Ceramic Green Sheet

A ceramic green sheet including ceramic powder is prepared.

The ceramic green sheet may be prepared by mixing ceramic powder, a binder, and a solvent, and so on to prepare slurry and forming the slurry using doctor blade in the form a sheet with a thickness of several μm. Then, the ceramic green sheet may be sintered to form one dielectric layer 111 as shown in FIG. 4.

The ceramic green sheet may have a thickness equal to or less than 0.6 μm and, thus, the dielectric layer may have a thickness equal to or less than 0.4 μm after being sintered.

According to an exemplary embodiment of the present disclosure, even if a dielectric layer and an internal electrode are very thin, increase in electrode disconnection and lumping may be effectively prevented and, thus, a dielectric layer with a thickness equal to or less than 0.4 μm may be formed.

Forming Internal Electrode Pattern

An internal electrode pattern may be formed by coating the paste for the internal electrode including conductive powder including a coating layer formed on a surface thereof and including tin (Sn) or conductive powder including tin (Sn) in the form of an alloy, on the ceramic green sheet. Content of tin (Sn) may be greater than or equal to about 1.5 wt %, based on a total weight of the conductive powder.

The internal electrode pattern may be formed using a screen printing method or a Gravure printing method.

There may be various problems such as electrode disconnection and electrode lumping due to a sintering temperature difference between the internal electrode paste and the ceramic green sheet. In particular, as a thickness of the internal electrode is reduced, the probability that the problem occurs gradually increases.

To overcome the problem such as electrode disconnection and electrode lumping, a method of dispersing a ceramic material to delay sintering of conductive powder has been developed, but there is a local problem depending on a dispersed state of the ceramic material and a large amount of the ceramic material and organic materials need to be included to achieve a sufficient effect.

Some organic materials used to improve sheet strength may remain as residual carbon (crystallized carbon) during plasticization, causing problems such as electrode lumping and non-uniform sintering of a dielectric layer. The problem may be partially overcome by process optimization but it may be difficult to overcome the problem simply using process optimization along with thinning of an internal electrode and a dielectric layer.

According to an exemplary embodiment of the present disclosure, conductive powder including a coating layer formed on a surface thereof and including tin (Sn) may prevent contact between conductive powders to delay sintering irrespective of dispersibility and conductive powder including tin (Sn) in the form of an alloy may also delay sintering irrespective of dispersibility.

When conductive powder without tin (Sn) is used, there is a worry in that residual carbon (crystallized carbon) observed like a skein on an electrode surface is generated to cause a problem such as electrode lumping and non-uniform sintering of a dielectric layer but, according to an exemplary embodiment of the present disclosure, conductive powder including a coating layer formed on a surface thereof and including tin (Sn) or conductive powder including tin (Sn) in the form of an alloy may prevent residual carbon (crystallized carbon) from being formed due to a function of a dehydrogenation catalyst of the conductive powder during plasticization.

Tin (Sn) is barely solidified in conductive powder but has good wettability with conductive powder and a low melting point and, thus, tin (Sn) may be thickened on a surface of crystal grain of an internal electrode during a sintering procedure to form a composite layer including nickel (Ni) and tin (Sn), thereby preventing a crystal grain from being grown.

Accordingly, according to an exemplary embodiment of the present disclosure, increase in electrode disconnection and lumping may be prevented and, in particular, even if a dielectric layer and an internal electrode are very thin, an increase in the electrode disconnection and lumping may be effectively prevented.

As shown in FIG. 5, tin (Sn) is thickened on a surface of a crystal grain 121a of the internal electrode during a sintering procedure to form a composite layer 121b including nickel (Ni) and tin (Sn), thereby preventing a crystal grain from growing.

FIG. 1 is a graph illustrating comparison of a thermal contraction behavior of conductive powder without tin (Sn) (Comparative Example 1), conductive powder in which a tin (Sn) content of a coating layer based on the conductive powder is 0.2 wt % (Comparative Example 2), and conductive powder in which a tin (Sn) content of a coating layer based on the conductive powder is 1.5 wt % (Inventive Example 1).

As seen from FIG. 1, as a tin (Sn) content of the coating layer based on conductive powder is increased, temperature at which contraction begins is increased. However, Comparative Example 2 has a tin (Sn) content less than 1.5 wt % and has the contraction beginning temperature that is not largely different from in Comparative Example 1 and, thus, has an insufficient effect. On the other hand, it may be seen that Inventive Example 1 in which a tin (Sn) content of a coating layer is 1.5 wt % based on conductive powder has a remarkably high temperature at which contraction begins compared with Comparative Example 1.

Accordingly, a tin (Sn) content based on conductive powder may be greater than or equal to about 1.5 wt %. It may not be required to limit an upper limit of a tin (Sn) content based on conductive powder but the upper limit may be equal to or less than 4.0 wt %.

The internal electrode pattern may have a thickness equal to or less than 0.5 μm and, thus, the internal electrode may have a thickness equal to or less than 0.4 μm after being sintered. According to an exemplary embodiment of the present disclosure, even if a dielectric layer and an internal electrode are very thin, increase in electrode disconnection and lumping may be effectively prevented and, thus, an internal electrode with a thickness equal to or less than 0.4 μm may be formed.

The coating layer including tin (Sn) formed on a surface of the conductive powder may further include one or more of copper (Cu), silver (Ag), palladium (Pd), platinum (Pt), rhodium (Rh), iridium (Ir), and ruthenium (Ru).

The conductive powder including tin (Sn) in the form of an alloy may further include one or more of copper (Cu), silver (Ag), palladium (Pd), platinum (Pt), rhodium (Rh), iridium (Ir), and ruthenium (Ru) in the form of an alloy.

The coating layer including tin (Sn) formed on a surface of the conductive powder may further include one or more of tungsten (W), molybdenum (Mo), chromium (Cr), and cobalt (Co).

The conductive powder including tin (Sn) in the form of an alloy may further include one or more of tungsten (W), molybdenum (Mo), chromium (Cr), and cobalt (Co).

W, Mo, Cr, and Co has a high melting point and, thus, an effect of preventing a crystal grain from growing by tin (Sn) with a low melting point may be further enhanced.

The coating layer including tin (Sn) formed on a surface of the conductive powder may be formed using an atomic layer deposition (ALD) process.

The atomic layer deposition (ALD) process is a technology of depositing a thin film or a passivation layer on a surface of a substrate during a semiconductor process and a technology of stacking atomic layers one by one to grow a thin film unlike a conventional deposition technology of chemically covering a thin film. The atomic layer deposition (ALD) process advantageously has excellent step-coverage, easily adjusts a thickness of a thin film, and easily forms a uniform thin film.

The coating layer including tin (Sn) formed on a surface of the conductive powder may be formed using an atomic layer deposition (ALD) process and, thus, a dense and uniform tin (Sn) coating layer may be formed.

The paste for the internal electrode may further include sulfur (S) of 300 ppm or less (excluding 0) based on content of the conductive powder.

In general, a conductive paste for forming an internal electrode may include sulfur (S) that is a contraction retarder but, when content of S is greater than 300 ppm, there may be a worry in that a composite layer including nickel (Ni) and tin (Sn) is non-uniformly formed.

In general, a conductive paste for an internal electrode may include sulfur (S) that acts as a contraction retarder but, when a content of S is greater than 300 ppm, the composite layer including nickel (Ni) and tin (Sn) may not be uniformly formed.

The conductive powder may be nickel (Ni) powder with a higher melting point than tin (Sn).

Forming Ceramic Multilayer Structure

Ceramic green sheets with internal electrode patterns formed thereon may be stacked to form a ceramic multilayer structure.

In this case, the ceramic multilayer structure may be pressurized and compressed in a stacking direction.

Then, the ceramic multilayer structure may be cut for each region corresponding to one capacitor to form a chip.

In this case, the ceramic multilayer structure may be cut to alternately expose ends of the internal electrode patterns through a lateral surface of the ceramic multilayer structure. Accordingly, as shown in FIG. 2, a ceramic green sheet (FIG. 2A) in which an internal electrode pattern P1 is formed as the first internal electrode 121 on a ceramic green sheet S after being sintered and a ceramic green sheet (FIG. 2B) in which an internal electrode pattern P2 is formed as the second internal electrode 122 on the ceramic green sheet S after being sintered may be alternately stacked.

Forming Body

The ceramic multilayer structure may be sintered to form a body including the dielectric layer and the internal electrode.

The sintering process may be performed in a reduction condition. The sintering process may be performed while adjusting a heating rate but the present disclosure not limited thereto and, in this case, the heating rate may be 30° C./60 s to 50° C./60 s at 700° C. or less.

Then, an external electrode may be formed to cover the lateral surface of the body and to be electrically connected to the internal electrode exposed through the lateral surface of the body. Then, a plating layer formed of Ni, Sn, or the like may be formed on a surface of the external electrode.

It may not be required to particularly limit a size of the body.

However, to simultaneously achieve miniaturization and high capacity, a dielectric layer and an internal electrode need to be thinned to increase a stack number, thereby remarkably enhancing an effect of preventing increase in electrode disconnection and lumping in a multilayer ceramic electronic component with a size equal to or less than 0402 (0.4 mm×0.2 mm) according to the present disclosure. Accordingly, the body may have a length equal to or less than 0.4 mm and a thickness equal to or less than 0.2 mm.

Multilayer Ceramic Electronic Component

A multilayer ceramic electronic component 100 manufactured using the aforementioned method of manufacturing a multilayer ceramic electronic component according to an exemplary embodiment of the present disclosure may include a body 110 including the dielectric layer 111 and the internal electrodes 121 and 122, and external electrodes 131 and 132 disposed on the body 110 and, in this case, the internal electrodes 121 and 122 may include the metallic crystal grain 121a and the composite layer 121b surrounding the metallic crystal grain 121a and including nickel (Ni) and tin (Sn).

The body 110 may be configured in such a way that the dielectric layer 111 and the internal electrodes 121 and 122 are alternately stacked.

A detailed shape of the body 110 is not particularly limited but, as illustrated in the drawings, the body 110 may have a hexahedral shape or a similar shape thereto. Due to contraction of ceramic powder included in the body 110 during a sintering procedure, the body 110 may have a substantially hexahedral shape but not a hexahedral shape with a complete straight line.

The body 110 may include first and second surfaces 1 and 2 facing each other in the thickness direction (the Z direction), third and fourth surfaces 3 and 4 connected to the first and second surfaces 1 and 2 and facing each other in the width direction (the Y direction), and fifth and sixth surfaces 5 and 6 connected to the first and second surfaces 1 and 2, connected to the third and fourth surfaces 3 and 4, and facing each other in the longitudinal direction (the X direction).

The plurality of dielectric layers 111 forming the body 110 may be in a sintered state and may be integrated into each other in such a way that it is difficult to check a boundary between adjacent dielectric layers 111 without use of a scanning electron microscope (SEM).

A material of the dielectric layer 111 is not particularly limited as long as sufficient capacitance is acquirable and may be, for example, barium titanate ($BaTiO_3$) powder. A material for forming the dielectric layer 111 may be formed by adding various ceramic additives, organic solvents, plasticizers, bonding agents, dispersants, or the like to powder such as barium titanate ($BaTiO_3$) according to the objective of the present disclosure.

The capacitor body 110 may include a cover layer 112 that is formed at each of upper and lower portions thereof, that is, at opposite end portions in the thickness direction (the Z direction) thereof and is formed by stacking dielectric layers without an internal electrode. The cover layer 112 may maintain the reliability of a capacitor with respect to external shocks.

It may not be required to particularly limit the thickness of the cover layer 112. However, to easily achieve miniaturization and high capacity of a capacitor component, the cover layer 112 may have a thickness equal to or less than 20 μm.

It may not be required to particularly limit a thickness of the dielectric layer 111.

However, according to the present disclosure, even if the dielectric layer and the internal electrode are very thin, an increase in electrode disconnection and lumping may be effectively present and, thus, the dielectric layer 111 may have a thickness equal to or less than 0.4 μm to easily achieve miniaturization and high capacity of a capacitor component.

The thickness of the dielectric layer 111 may refer to an average thickness of the dielectric layers 111 disposed between the first and second internal electrodes 121 and 122.

The average thickness of the dielectric layers 111 may be measured by scanning an image of a section of the body 110 in a length-thickness (L-T) direction using a scanning electron microscope (SEM).

For example, with regard to arbitrary dielectric layer extracted from the image of the sectional view in the length-thickness (L-T) direction of the body 110, which is cut at a central portion of a width direction of the body 110 and is scanned using a scanning electronic microscope (SEM), thicknesses may be measured at 30 points spaced apart at equidistant intervals in the longitudinal direction to measure an average value.

The thicknesses may be measured at the 30 points spaced apart at equidistant intervals, which refers to a capacity formation portion at which the first and second internal electrodes 121 and 122 overlap with each other.

Then, the internal electrodes 121 and 122 and a dielectric layer may be alternately stacked and may include the first and second internal electrodes 121 and 122. The first and second internal electrodes 121 and 122 may be alternately disposed to face each other across the dielectric layer 111 configuring the body 110 and may be exposed through the third and fourth surfaces 3 and 4 of the body 110, respectively.

In this case, the first and second internal electrodes 121 and 122 may be electrically separated from each other by the dielectric layer 111 disposed therebetween.

The conductive paste may be printed using a screen printing method, a Gravure printing method, or the like but the present disclosure is not limited thereto.

Hereinafter, the first electrode 121 is described with reference to FIG. 5, which may be applied to the second electrode 122 in the same way.

The internal electrode 121 may include the metallic crystal grain 121a and the composite layer 121b surrounding the metallic crystal grain and including nickel (Ni) and tin (Sn). The composite layer 121b including nickel (Ni) and tin (Sn) may substantially completely surround at least one metallic crystal grain 121a. In the internal electrode, a content of tin (Sn) may be greater than or equal to about 1.5 wt %, based on a total weight of the internal electrode. Furthermore, an upper limit of a tin (Sn) content based on the internal electrode may be equal to or less than about 4.0 wt %.

The metallic crystal grain 121a may be formed like a polyhedron made by uniformly arranging metallic atoms. The composite layer 121b including nickel (Ni) and tin (Sn) may surround the metallic crystal grain 121a. That is, the composite layer 121b including nickel (Ni) and tin (Sn) may be present at a metal grain boundary. The composite layer 121b including nickel (Ni) and tin (Sn) may prevent the metallic crystal grain 121a from growing outward to prevent internal electrode disconnection and to prevent internal electrode lumping.

When a ratio of a length of portions on which the internal electrode is actually formed to an entire length of the internal electrode is defined as connectivity C of the internal electrode, the composite layer 121b including nickel (Ni) and tin (Sn) may prevent the metallic crystal grain 121a from growing outward and, thus, the internal electrode 121 may satisfy $85\% \leq C$.

The composite layer 121b including nickel (Ni) and tin (Sn) may have a thickness of 1 to 15 nm.

When the thickness of the composite layer 121b including nickel (Ni) and tin (Sn) is less than 1 nm, a metal crystal grain may not be sufficiently prevented from growing outward and, when the thickness is greater than 15 nm, the thickness of the composite layer 121b including nickel (Ni) and tin (Sn) may not be uniform and, thus, an effect of preventing the metal crystal grain from growing outward may be degraded.

The metallic crystal grain 121a may be a nickel (Ni) crystal grain.

It may not be required to particularly limit a thickness of the first and second internal electrodes 121 and 122.

However, even if a dielectric layer and an internal electrode are very thin, increase in electrode disconnection and lumping may be effectively prevented and, thus, the first and second internal electrodes 121 and 122 may have a thickness equal to or less than 0.4 μm to easily achieve miniaturization and high capacity of a capacitor component.

The thickness of the first and second internal electrodes 121 and 122 may refer to an average thickness of the first and second internal electrodes 121 and 122.

The average thickness of the first and second internal electrodes 121 and 122 may be measured by scanning an image of a section of the body 110 in a length-thickness (L-T) direction using a scanning electron microscope (SEM).

For example, with regard to arbitrary first and second internal electrodes 121 and 122 extracted from the image of the sectional view in the length-thickness (L-T) direction of the body 110, which is cut at a central portion of a width direction of the body 110 and is scanned using a scanning electronic microscope (SEM), thicknesses may be measured at 30 points spaced apart at equidistant intervals in the longitudinal direction to measure an average value.

The thicknesses may be measured at the 30 points spaced apart at equidistant intervals, which refers to a capacity formation portion at which the first and second internal electrodes 121 and 122 overlap with each other.

The external electrodes 131 and 132 may be disposed in the body 110 and may be connected to the internal electrodes 121 and 122. As shown in FIG. 4, the capacitor component 100 may include the first and second internal electrodes 121 and 122 and the first and second external electrodes 131 and 132 connected thereto, respectively. According to the present embodiment, although the structure in which the capacitor component 100 includes two external electrodes 131 and 132 is described, the number, the shape, or the like of the external electrodes 131 and 132 may be changed depending on a shape of the internal electrodes 121 and 122 or other objectives.

The external electrodes 131 and 132 may be formed of any material as long as the material has electrical conductivity, such as metal, a detailed material may be determined in consideration of electrical characteristics, structural stability, and so on, and the external electrodes 131 and 132 may have a multi-layered structure.

For example, the external electrodes 131 and 132 may include electrode layers 131*a* and 132*a* disposed in the body 110 and plating layers 131*b* and 132*b* formed on the electrode layers 131*a* and 132*a*.

As a more detailed example of the electrode layers 131*a* and 132*a*, the electrode layers 131*a* and 132*a* may be a sintered electrode including conductive metal and glass and, in this case, the conductive metal may be Cu. In addition, the electrode layers 131*a* and 132*a* may be a resin-based electrode including a plurality of metallic particles and conductive resin.

As a more detailed example of the plating layers 131*b* and 132*b*, the plating layers 131*b* and 132*b* may be a nickel (Ni) plating layer or a tin (Sn) plating layer, may be formed in such a way that the nickel (Ni) plating layer and the tin (Sn) plating layer are sequentially formed on the electrode layers 131*a* and 132*a*, or may include a plurality of nickel (Ni) plating layers and/or a plurality of tin (Sn) plating layers.

It may not be required to particularly limit a size of the multilayer ceramic electronic component.

However, to simultaneously achieve miniaturization and high capacity, a thickness of a dielectric layer and an internal electrode needs to be reduced and a stack number needs to be increased, thereby remarkably enhancing an effect of preventing increase in electrode disconnection and lumping according to the present disclosure in a multilayer ceramic electronic component with a size equal to or less than 0402 (0.4 mm×0.2 mm). Accordingly, the multilayer ceramic electronic component may have a length equal to or less than 0.4 mm and a thickness equal to or less than 0.2 mm.

As set forth above, according to the present disclosure, the paste for the internal electrode including conductive powder including the coating layer formed on the surface thereof and including tin (Sn) or conductive powder including tin (Sn) in the form of an alloy is used and, thus, internal electrode lumping and internal electrode disconnection may be prevented.

While exemplary embodiments have been shown and described above, it will be apparent to those skilled in the art that modifications and variations could be made without departing from the scope of the present disclosure as defined by the appended claims.

What is claimed is:

1. A method of manufacturing a multilayer ceramic electronic component, the method comprising:
preparing a ceramic green sheet;
forming an internal electrode pattern by coating a paste for an internal electrode including conductive powder including tin (Sn) on the ceramic green sheet;
forming a ceramic multilayer structure by stacking the ceramic green sheets on which the internal electrode pattern is formed; and
forming a body including a dielectric layer and an internal electrode by sintering the ceramic multilayer structure,
wherein a content of tin (Sn) is greater than or equal to about 1.5 wt %, based on a total weight of the conductive powder, and
wherein a metal coating layer including tin (Sn) is formed on a surface of the conductive powder.

2. The method of claim 1, wherein the ceramic green sheet has a thickness equal to or less than 0.6 μm and the internal electrode pattern has a thickness equal to or less than 0.5 μm.

3. The method of claim 1, wherein the metal coating layer further includes at least one selected from the group of copper (Cu), silver (Ag), palladium (Pd), platinum (Pt), rhodium (Rh), iridium (Ir), and ruthenium (Ru).

4. The method of claim 1, wherein the metal coating layer further includes at least one selected from the group of tungsten (W), molybdenum (Mo), chromium (Cr), and cobalt (Co).

5. The method of claim 1, wherein the metal coating layer is formed using an atomic layer deposition (ALD) process.

6. The method of claim 1, wherein the conductive powder includes an alloy of tin (Sn), and the alloy further include at least one selected from the group of copper (Cu), silver (Ag), palladium (Pd), platinum (Pt), rhodium (Rh), iridium (Ir), and ruthenium (Ru).

7. The method of claim 1, wherein the conductive powder includes an alloy of tin (Sn), and the alloy further includes at least one selected from the group of tungsten (W), molybdenum (Mo), chromium (Cr), and cobalt (Co).

8. The method of claim 1, wherein the conductive powder further includes sulfur (S) in a content of 300 ppm or less, based on a total content of the conductive powder.

9. The method of claim 1, wherein the conductive powder is nickel (Ni) powder.

10. The method of claim 1, wherein the body has a length equal to or less than 0.4 mm and a thickness equal to or less than 0.2 mm.

11. A multilayer ceramic electronic component manufactured using the method of claim 1, comprising:
the body including the dielectric layer and the internal electrode; and
an external electrode disposed on the body, wherein the internal electrode includes a metallic crystal grain and a metal composite layer surrounding the metallic crystal grain and including nickel (Ni) and tin (Sn).

12. The multilayer ceramic electronic component of claim 11, wherein the dielectric layer has a thickness equal to or less than 0.4 μm and the internal electrode has a thickness equal to or less than 0.4 μm.

13. The multilayer ceramic electronic component of claim 11, wherein the metal composite layer including nickel (Ni) and tin (Sn) has a thickness within a range from 1 to 15 nm.

14. The multilayer ceramic electronic component of claim 11, wherein the metallic crystal grain is a nickel (Ni) crystal grain.

15. The multilayer ceramic electronic component of claim 11, wherein 85%≤C, where C is a ratio of a length of portions on which the internal electrode is actually formed to an entire length of the internal electrode.

16. The multilayer ceramic electronic component of claim 11, wherein the metallic crystal grain includes a nickel (Ni) crystal grain, and
wherein the metal composite layer including tin (Sn) and nickel (Ni) substantially surrounds the nickel (Ni) crystal grain.

17. A multilayer ceramic electronic component, comprising:
a body including a dielectric layer and an internal electrode; and
an external electrode disposed on the body and connected to the internal electrode,
wherein the internal electrode includes nickel (Ni) and a metal composite layer including nickel (Ni) and tin (Sn), and
wherein, in the internal electrode, a content of tin (Sn) is greater than or equal to about 1.5 wt %, based on a total weight of the internal electrode.

18. The multilayer ceramic electronic component of claim 17, wherein the metal composite layer further includes at least one selected from the group of copper (Cu), silver (Ag), palladium (Pd), platinum (Pt), rhodium (Rh), iridium (Ir), and ruthenium (Ru).

19. The multilayer ceramic electronic component of claim 17, wherein the metal composite layer further includes at least one selected from the group of tungsten (W), molybdenum (Mo), chromium (Cr), and cobalt (Co).

20. The multilayer ceramic electronic component of claim 17, wherein the internal electrode further includes sulfur (S) in a content of 300 ppm or less, based on a total content of conductive powder.

21. A method of manufacturing a multilayer ceramic electronic component, the method comprising:
preparing a ceramic green sheet;
forming an internal electrode pattern by coating a paste for an internal electrode including conductive powder including tin (Sn) on the ceramic green sheet;
forming a ceramic multilayer structure by stacking the ceramic green sheets on which the internal electrode pattern is formed; and
forming a body including a dielectric layer and an internal electrode by sintering the ceramic multilayer structure,
wherein a content of tin (Sn) is greater than or equal to about 1.5 wt %, based on a total weight of the conductive powder, and
wherein a coating layer including tin (Sn) is formed on a surface of the conductive powder using an atomic layer deposition (ALD) process.

* * * * *